Patented June 2, 1931

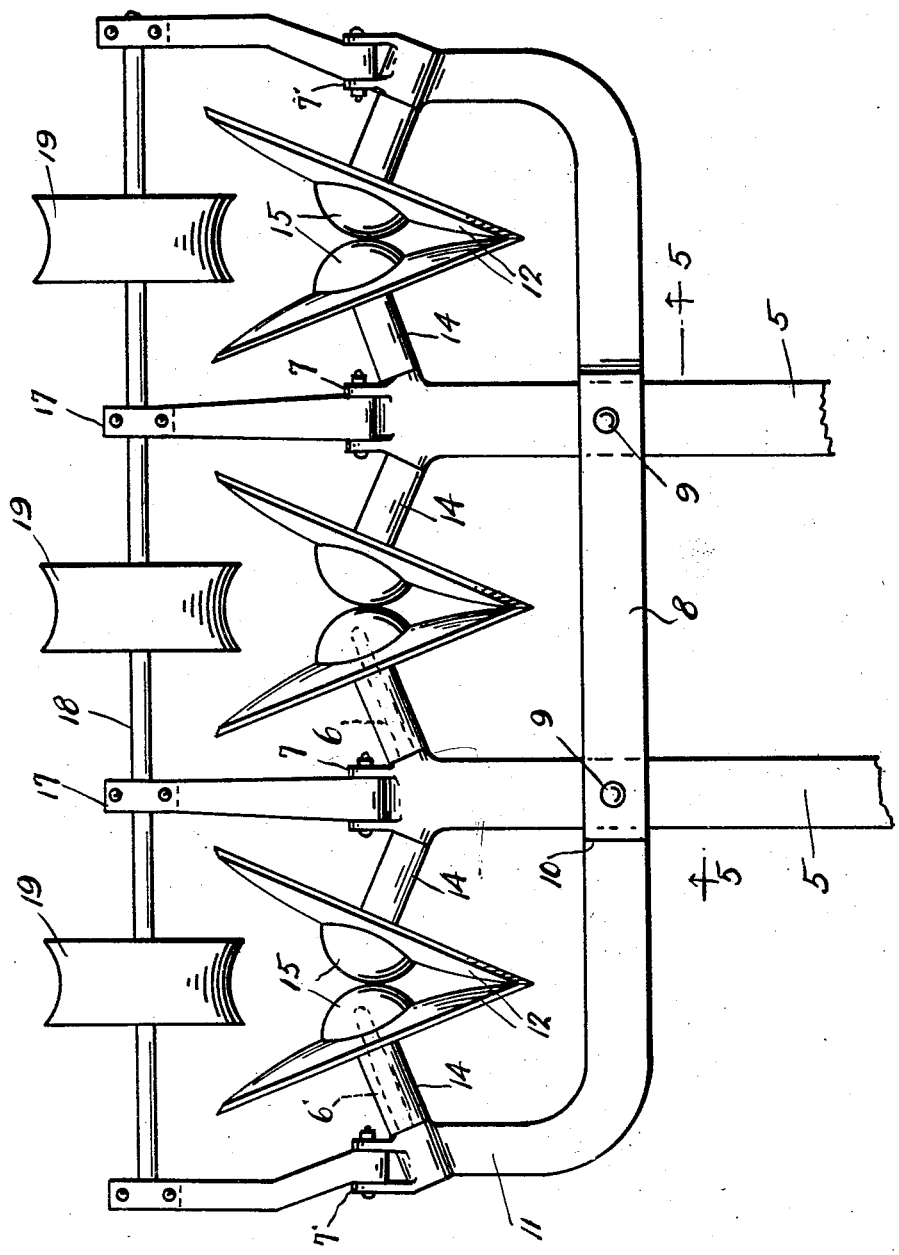

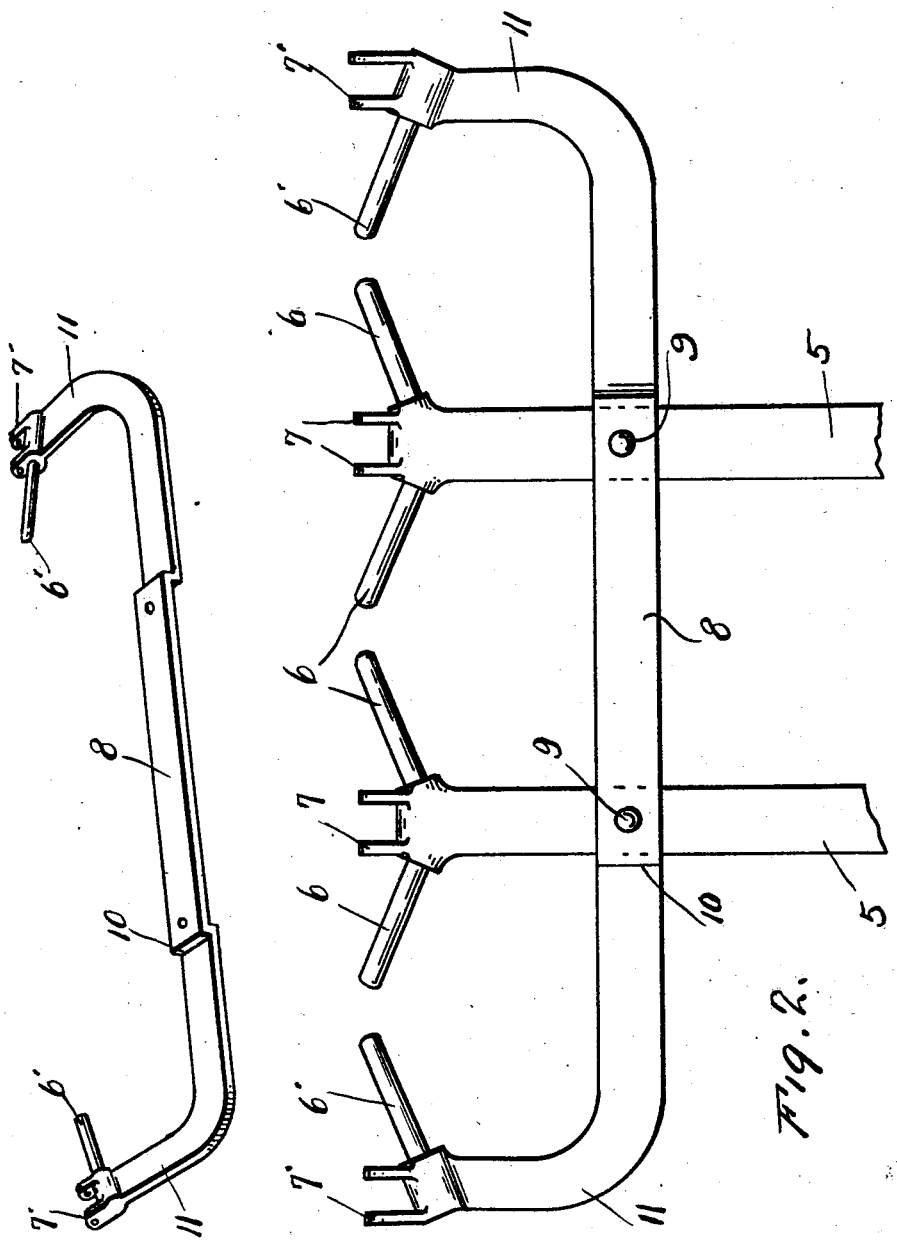

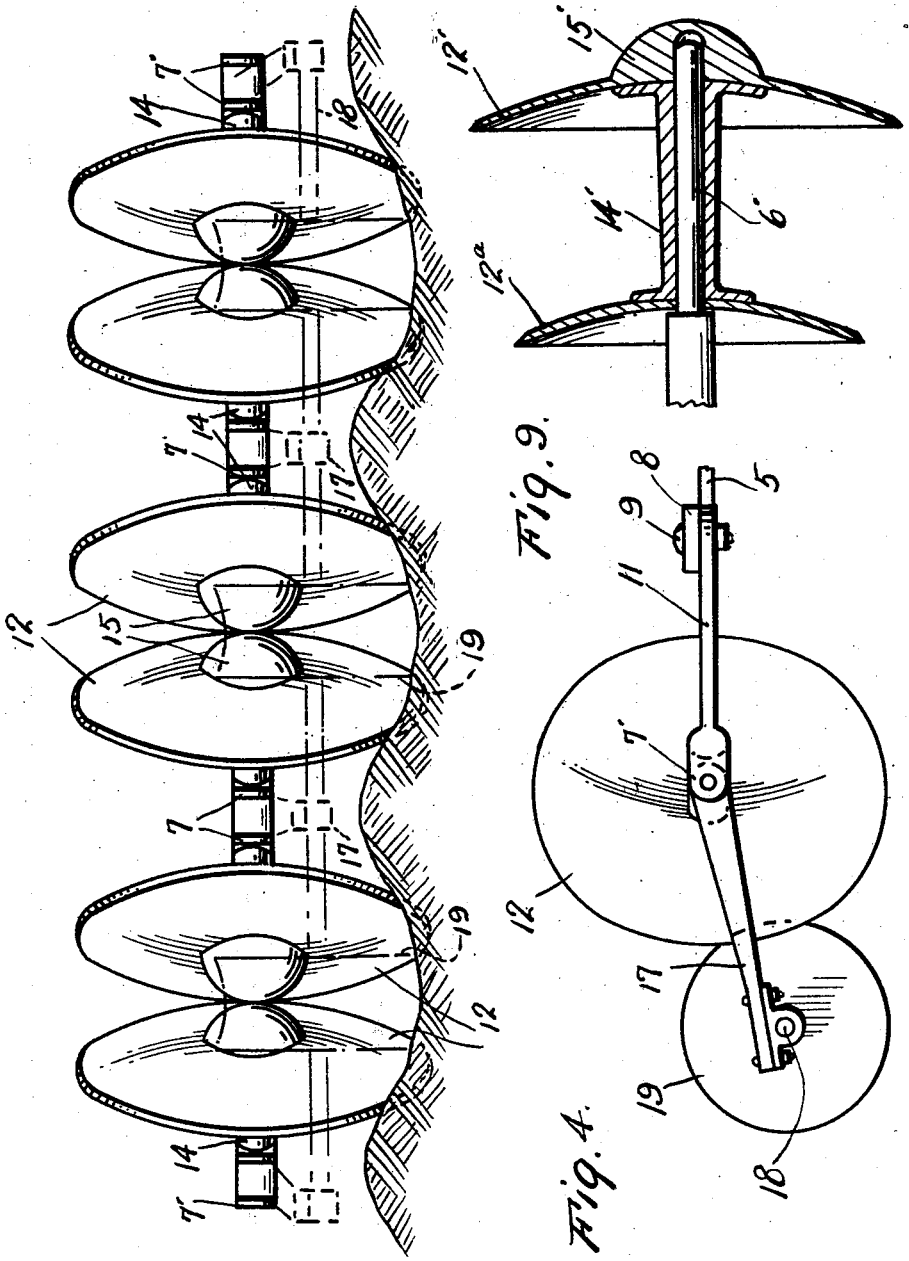

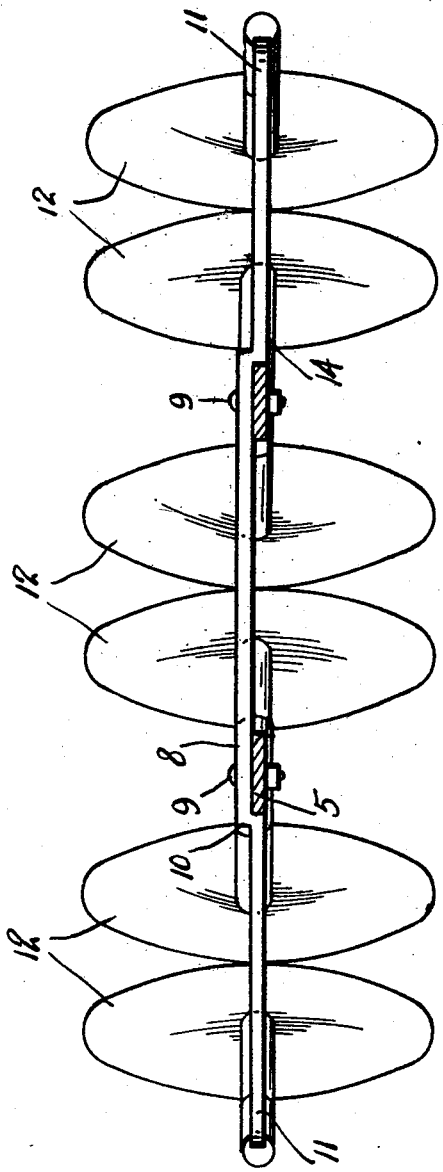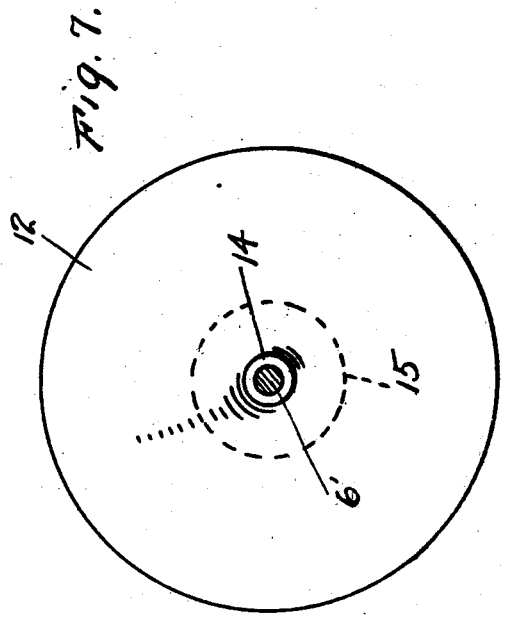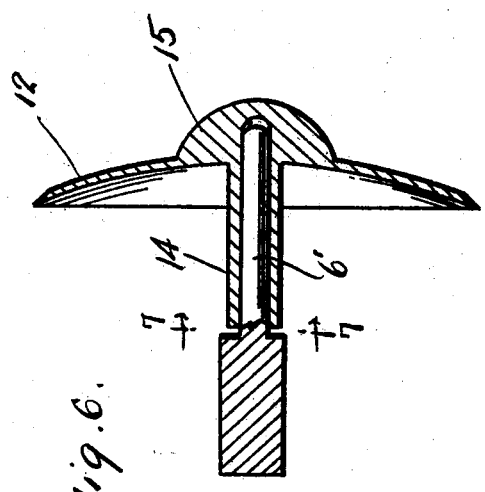

1,807,827

UNITED STATES PATENT OFFICE

FRANK S. BROWN, OF HERNDON, KANSAS

DEEP FURROW GRAIN DRILL

Application filed October 17, 1930. Serial No. 489,448.

The present invention relates to a deep furrow grain drill to be used in combination with a planter and the disks are arranged in such a way that one or two rows of grain can be planted in the furrow so that the grain will be protected in winter from freezing and in the summer the rain is caught and stored in the furrow so as to prevent the plant roots from burning by the sun.

Another very important object of the invention resides in the provision of a drill which permits the seed to be planted in solid seed beds or ridges.

A still further very important object of the invention resides in the provision of a drill structure of this nature which is simple, inexpensive to manufacture, easy to assemble and disassemble, thoroughly efficient and reliable in use and operation, and otherwise well adapted to the purpose for which it is designed.

With the above and numerous other objects in view as will appear as the description proceeds, the invention comprises certain novel features of construction as will be hereinafter more fully described and claimed.

In the drawings:

Figure 1 is a top plan view of the apparatus embodying the features of my invention, Figure 2 is a top plan view of the frame, Figure 3 is a rear elevation of the apparatus with the packing rollers removed, Figure 4 is a side elevation of the apparatus, Figure 5 is a sectional view taken substantially on the line 5—5 of Figure 1, Figure 6 is a detail section through one of the disks, Figure 7 is a sectional view taken substantially on the line 7—7 of Figure 6, and Figure 8 is a perspective view of one of the frame sections, and Figure 9 is a sectional view through a modified form of disk assembly.

Referring to the drawings in detail it will be seen that numerals 5 denote a pair of spaced parallel coextensive longitudinally extending beams on the rear ends of which are pairs of rearwardly diverging trunnions 6 and pairs of ears 7 rearwardly extending. A cross frame member 8 is attached by suitable means 9 on the beams 5 and is offset downwardly as at 10 immediately to the outside of the beams and terminates in rearward extensions 11 on the ends of which are rearwardly converging trunnions 6'.

At the rear of each extension 11 there is a pair of spaced paralled ears 7'. A plurality of disks 12 of concavo-convex formation have projecting from their concaved sides elongated sleeves 14 and from their convex sides outwardly bowed hubs 15. The trunnions 6 or 6' extend into the sleeves 14 and a portion of the hub 15 so that the disks are rotatable thereon. The outwardly bulged hubs 15 abut each other as is illustrated to advantage in Figures 1 and 2, thereby preventing the disks from coming off of the trunnions when assembled. It will be understood, of course that the disks are assembled on the trunnions before frame section 8 is placed on the beams 5.

A plurality of arms 17 are rockable between the ears 7 and 7' and extend rearwardly and attached to their rear ends is a shaft 18 with packing rollers 19 thereon, one to the rear of each pair of disks.

In Figure 9 I have shown another disk assembly. Disk 12' has the bulged hub 15' and a separable sleeve 14' and a small supplemental disk 12a is at the end of the sleeve 14' remote from the disk 12'. This small disk is used in wide planting.

It is thought that the construction, operation, utility and advantages of this invention will now be clearly understood by those skilled in this art without a more detailed description thereof. It will be understood that any suitable clamping mechanism may be used in combination with the apparatus.

The present embodiment of the apparatus has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a pair of beams each having a pair of rearwardly diverging trunnions, a cross frame member attached to the beams and having rearward extensions at the ends thereof provided with rearwardly converging trunnions, disks of concavo-convex formation having sleeves projecting from the concave sides thereof and journalled on the trunnions and having bulged hub portions on the convex sides thereof, said hub portions abutting each other to hold the disks assembled on the trunnions.

2. In an apparatus of the class described, a pair of beams each having a pair of rearwardly diverging trunnions, a cross frame member attached to the beams and having rearward extensions at the ends thereof provided with rearwardly converging trunnions, disks of concavo-convex formation having sleeves projecting from the concave sides thereof and journalled on the trunnions and having bulged hub portions on the convex sides thereof, said hub portions abutting each other to hold the disks assembled on the trunnions in paired relation, ears at the ends of the beams and the extensions, arms rockable between the ears and supporting at their rear ends a shaft, and packing rollers on said shaft, one to the rear of each pair of disks.

In testimony whereof I affix my signature.

FRANK S. BROWN.